United States Patent [19]

Obara

[11] 4,383,160
[45] May 10, 1983

[54] AUTOMATIC CUTTING CONDITION CHANGEOVER EQUIPMENT

[75] Inventor: Haruki Obara, Sagamihara, Japan

[73] Assignee: Fujitsu Fanuc Limited, Tokyo, Japan

[21] Appl. No.: 242,440

[22] Filed: Mar. 11, 1981

[30] Foreign Application Priority Data

Mar. 29, 1980 [JP] Japan .................. 55/40713

[51] Int. Cl.³ .................................. B23P 1/08
[52] U.S. Cl. ................... 219/69 W; 219/69 G; 219/69 P
[58] Field of Search ............ 219/69 M, 69 R, 69 V, 219/69 C, 69 W, 69 S, 68, 69 P

[56] References Cited

U.S. PATENT DOCUMENTS

| | | | |
|---|---|---|---|
| 3,731,045 | 5/1973 | Ullmann et al. | 219/69 W |
| 4,078,163 | 3/1978 | Bell, Jr. et al. | 219/69 W |

FOREIGN PATENT DOCUMENTS

| | | | |
|---|---|---|---|
| 53-66092 | 6/1978 | Japan | 219/69 W |
| 54-13096 | 1/1979 | Japan | 219/69 W |

*Primary Examiner*—M. H. Paschall
*Attorney, Agent, or Firm*—Staas & Halsey

[57] ABSTRACT

An automatic cutting condition changeover equipment for automatically changing over an electrical cutting condition of a wire-cut, electric discharge machine in accordance with the thickness of a work. The equipment is provided with a feed control circuit for controlling the cutting speed of the work so that a mean working voltage between a wire electrode and the work may be constant, an arithmetic logic unit for calculating a predetermined optimum cutting condition formula on an on-line basis, and electrical cutting condition changeover control circuit for changing a peak current of the power source of the wire-cut, electric discharge machine so that the output from the arithmetic logic unit may be reduced to substantially zero.

6 Claims, 2 Drawing Figures

AUTOMATIC CUTTING CONDITION CHANGEOVER EQUIPMENT

BACKGROUND OF THE INVENTION

1. Field of the Invention

The present invention relates to automatic cutting condition changeover equipment which automatically changes the electrical cutting condition of a wire-cut, electric discharge machine in accordance with the thickness of the workpiece.

2. Description of the Prior Art

A wire-cut, electric discharge machine cannot achieve optimum cutting of the workpiece unless an electrical cutting conditions of the machine, which depend on the peak current Ip or the no-load voltage Vs of the power source or on the ON time $\tau_{on}$ and OFF time $\tau_{off}$ of a pulse current is changed sharply in accordance with the thickness of the workpiece. For example, in the case of the peak current Ip being not varied in accordance with the work piece thickness if a workpiece of small thickness is cut under the same conditions as those for a workpiece of large thickness, then a wire electrode will be broken; conversely, if the thick workpiece is cut under the same conditions as those for a thin workpiece, then a sufficient cutting speed will not be obtained. But manually changing the electrically cutting conditions for each particular workpiece is very troublesome to the operator and, further, complicates continuous, fully automatic cutting of a workpiece of uneven thickness. To solve such problems, there has already been proposed and put to practical use automatic cutting condition change-over equipment which is capable of automatically changing over the electrical cutting condition in response to variations in the thickness of a workpiece during cutting.

According to the conventional automatic cutting condition changeover equipment, for instance, cutting speeds corresponding to selected values of the peak current Ip and the optimum cutting condition are prestored in an electronic computer for each workpiece thickness. The thickness of a workpiece to be cut is estimated from an actual cutting speed and cutting condition through the use of the computer and compared with the prestored optimum cutting condition and then the peak current Ip is changed over to an optimum value. However, this prior art equipment requires, in addition to the use of an electronic computer, a large number of experiments for obtaining the data to be prestored in the computer; furthermore, since all the data thus obtained must be prestored, their processing is very troublesome.

SUMMARY OF THE INVENTION

It is an object of the present invention to provide an automatic cutting condition changeover equipment which does not require an electronic computer and is easy to handle.

Another object of the present invention is to provide an automatic cutting condition changeover equipment which is designed to lighten the cutting condition when cutting is unstable so as to prevent the breakage of the wire electrode.

Briefly stated, the automatic cutting condition changeover equipment of the present invention is provided with a feed control circuit which controls the cutting speed so that the mean working voltage between the wire electrode and the workpiece is constant, an arithmetic logic unit which is supplied with the cutting speed, the peak current or the mean working current of the power source of a wire-cut, electric discharge machine and constants determined by cutting conditions other than the peak current or mean working current and which performs calculations according to a predetermined optimum cutting condition formula, and electrical cutting condition changeover means which changes the peak current so that the output from the arithmetic logic unit is reduced to substantially zero. In the case where the peak current remains unchanged although the thickness of a workpiece has increased, the cutting speed lowers and, consequently the result of the calculation of the optimum cutting condition formula becomes minus and thus the peak current is increased by the electrical cutting condition changeover means. Conversely, when the peak current remains unchanged regardless of a decrease in the thickness of the workpiece, since the cutting speed increases, the calculation result of the abovesaid formula becomes plus and thus the peak current is decreased by the electrical cutting condition changeover means.

Further, a detector is provided for detecting variations in the mean working voltage, and the constants of the optimum cutting condition formula are altered in accordance with the variations in the mean working voltage to prevent the breakage of the wire electrode at a place where cutting is unstable.

DESCRIPTION OF THE PREFERRED EMBODIMENTS

Figure 1:
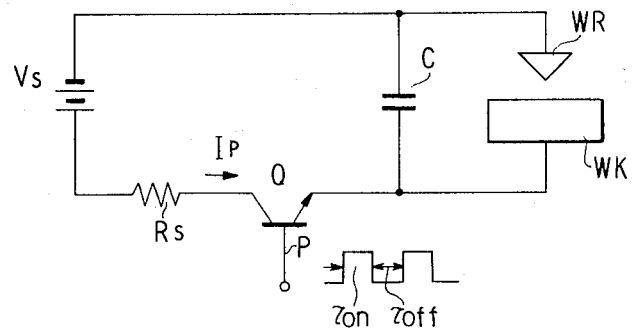
FIG. 1 is an electric circuit diagram showing a general arrangement of a power source for use in wire-cut, electric discharge machines.

In FIG. 1 there is depicted an electric circuit diagram of a power source of a wire-cut, electric discharge machine employed for obtaining an optimum cutting condition formula which is used in the present invention. Reference character Vs indicates a no-load voltage; Rs designates a charging resistor; Ip identifies a peak current; Q denotes a transistor; P represents a pulse signal for driving the transistor Q; $\tau_{on}$ and $\tau_{off}$ show the ON time and the OFF time of the pulse signal P; C refers to a capacitor; WR indicates a wire electrode; and WK designates a workpiece. According to the present inventor's experiments, a maximum cutting speed Fm and a peak current Ipm that would not cause shorting between the wire electrode WR and the workpiece WK or breakage of the wire electrode WR were obtained for workpieces of different thicknesses but of the same material. These results were obtained using the power source circuit of FIG. 1 in which the wire electrodes used were made of the same material and had the same diameter and the no-load voltage Vs, the ON time $\tau_{on}$ and the OFF time $\tau_{off}$ of the pulse signal P and the capacitance of the capacitor C were held unchanged. It has been found that the following expressions hold over a wide range of cutting speeds:

$$F_m = \frac{K_1}{\sqrt{h}} - F_0 \tag{1}$$

$$Ipm = K_2 \sqrt{h} \qquad (2)$$

In the above expressions, h is the thickness of the workpiece and $K_1$, $K_2$ and $F_0$ are constants which depend on electrical cutting conditions other than the peak current Ip, such as the materials of the workpiece and the wire electrode, and the diameter of the wire electrode. In the expressions (1) and (2), even if the cutting conditions other than the peak current are modified, only the constants $K_1$ and $K_2$ undergo change and the forms of the expressions do not change.

Eliminating the thickness h of the workpiece from the expressions (1) and (2), the following expression is obtained:

$$(Fm+F_0)Ipm = K \qquad (3)$$

where $K = K_1 K_2$ and the constant K is one that becomes large or small depending on whether or not the material of the workpiece is easy to cut. The constant $F_0$ varies with the value of the constant K according to experiments but it can be estimated approximately by the following expression:

$$F_0 = F_1 + \alpha K \qquad (4)$$

where $F_1$ is a constant which is determined by the electric circuit arrangement used and $\alpha$ is a sufficiently small constant. Accordingly, the constant $F_0$ can be regarded as constant in practice and it is fixed for each machine.

The present invention is intended to automatically change over the electrical cutting condition in accordance with the thickness of a workpiece on the basis of the following principles, using the abovesaid expressions (3) and (4).

At first, the feed of the wire electrode and the workpiece relative to each other is controlled so that the mean working voltage between them is constant. Such feed control has heretofore been carried out for preventing the width of the groove of a cutting path varying with the thickness of the workpiece so as to degrade the cutting accuracy, and many methods are known; accordingly, this control is effected by any of the known methods. During the feed control for making the mean working voltage constant, if a peak current Ip which is smaller than the Ipm of the maximum cutting speed condition given by the expression (3) is provided, (that is, if the peak current Ip remains unchanged regardless of an increase in the thickness of the workpiece) then the cutting speed F decreases and $(F+F_0)Ip$ becomes smaller than the constant K in the maximum cutting speed of the expression (3). Conversely, when the peak current Ip is too large, the cutting speed F increases, resulting in $(F+F_0)Ip > K$. Accordingly, by controlling the feed to make the mean working voltage constant and, at the same time, detecting the cutting speed F and the peak current Ip and checking whether they satisfy the expression (3), the thickness of the workpiece can be determined. Thus by increasing or decreasing the peak current Ip to meet the expression (3), the electrical cutting condition is automatically changed over in accordance with the thickness of the workpiece.

Figure 2:
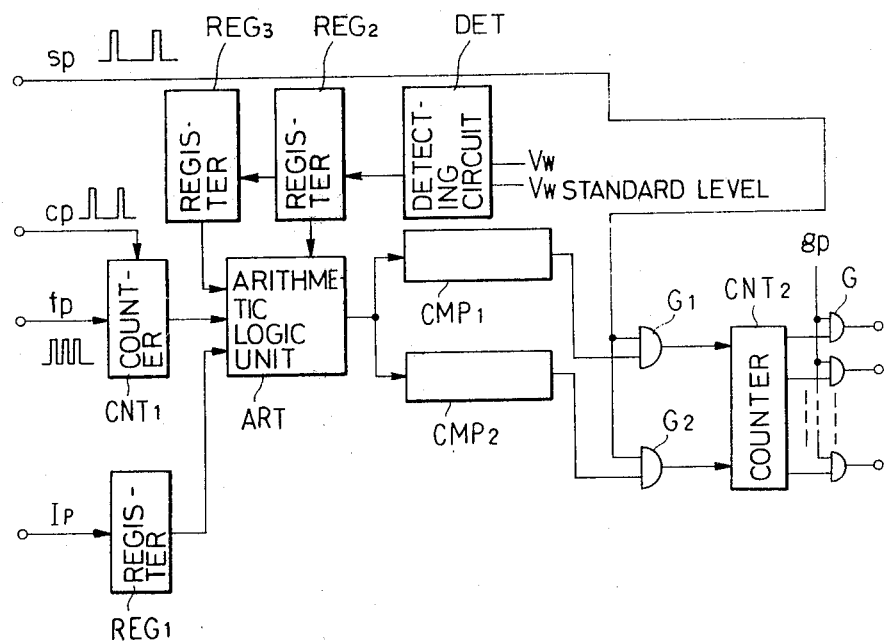
FIG. 2 is a block diagram illustrating the principal part of an embodiment of the automatic cutting condition change-over equipment of the present invention.

FIG. 2 illustrates, in block form, the principal part of an embodiment of the present invention. Reference characters CNT1 and CNT2 indicate counters; REG1 to REG3 designate registers; ART identifies an arithmetic logic unit; CMP1 and CMP2 denote decision circuits; DET represents a detector; G, G1 and G2 show AND circuits; Ip refers to peak current; fp indicates feed pulses; cp designates a feed rate command value; sp identifies sampling pulses; and gp denotes gate pulses.

In FIG. 2, the present cutting speed F is detected by counter CNT1 counting the feed pulses fp corresponding to a unit feed of the work table or by setting the feed rate command value cp from a numerical control unit in the counter CNT1 and then the cutting speed F thus detected is provided to the arithmetic logic unit ART. Likewise, the present peak current Ip is set in the register REG1 and then applied to the arithmetic logic unit ART. The register REG2 has set therein the value K obtained experimentally and the register REG3 has set therein the value $F_0$ which is determined by the discharge circuit employed in the power source of the wire-cut, electric discharge machine, and these values are also applied to the arithmetic logic unit ART.

The arithmetic logic unit ART calculates $(F-F_0)Ip-K$ from the cutting speed F, the peak current Ip and the values K and $F_0$, and provides the calculation result to the decision circuits CMP1 and CMP2. The decision circuit CMP1 decides whether the calculation result is plus or not and, in the case of plus, decreases the value of the counter CNT2. The decision circuit CMP2 decides whether the calculation result is smaller than $-\delta$ or not and, if smaller, increases the value of the counter CNT2. $\delta$ is used to provide a hysteresis operation so that the value of the counter CNT2 may not frequently vary and it is set to a value sufficiently smaller than the value K.

The output from each stage of the counter CNT2 is provided via the AND circuit G to peak current changeover means (not shown) to obtain the peak current value proportional to the content of the counter CNT2. As the peak current changeover means, use can be made of, for example, an arrangement in which several transistors Q such as shown in FIG. 1 are connected in parallel and the number of their operations is changed by the output from the counter CNT2, or an arrangement in which the value of the charging resistor Rs is changed by the output from the counter CNT2.

With the above-described arrangement, the peak current Ip can automatically be changed over in accordance with the thickness of a workpiece. The circuit shown in FIG. 2 is constructed so that a variation in the mean working voltage Vw is detected by the detector DET and the value K is reduced in accordance with the variation. The detector DET compares the variation between the mean working voltage Vw and the voltage Vw-STANDARD LEVEL, and if the variation is too high, provides a reducing signal to REG 2. The reason is as follows: In a wire-cut, electric discharge machining, cutting becomes unstable at a corner or a small-radius, and the wire electrode is liable to be broken. Accordingly the peak current Ip and other cutting conditions must be lightened at such portions of the workpiece, and since the mean working voltage usually undergoes a substantial change at the portion where the cutting is unstable, the value K is decreased by using the change in the mean working voltage. This permits stable cutting of the workpiece even at corners.

In the above embodiment the peak current Ip is measured but since it has been found by experiments that a relation similar to the expression (2) also holds for a mean working current Iw, it is also possible to measure the mean working current Iw instead of the peak current Ip in FIG. 2 and automatically change over the peak current Ip in accordance with the thickness of the workpiece so that $(F-F_0)Iw-K=0$.

As has been described in the foregoing, since the equipment of the present invention is constructed based on the experimental formula for the optimum cutting condition, no electronic computer is needed. Moreover since the value $F_0$ is fixed for each machine, it is sufficient only to input thereto the value K obtainable by simple experiments; therefore, the equipment of the present invention is far easier to operate than in the prior art. In general, the value K is experimentally obtained for each of various cutting conditions on the part of the machine maker and it is sufficient for the user to set the value K based on the experimental values. Even in the case where the cutting conditions such as the material of the workpiece, the capacitance of the capacitor and so forth have been changed, a new value K is determined only by experimental cutting of one workpiece and the peak current can automatically be changed over using the new value K. Accordingly, even in the case where the workpiece is made of a special material and no data on the value K are available from the machine maker, the workpiece can be cut with ease.

It will be apparent that many modifications and variations may be effected without departing from the scope of the novel concepts of this invention.

What is claimed is:

1. An automatic cutting condition change-over equipment having a power source and a wire electrode, and having a mean working voltage, a cutting speed, and a cutting speed signal responsive to the cutting speed for controlling the cutting speed of a workpiece, comprising:

a feed control circuit, operatively connected to receive the cutting speed signal, to the workpiece and to the wire electrode, for controlling the cutting speed so that the mean working voltage between the wire electrode and the workpiece is constant;

an arithmetic logic unit, operatively connected to receive the speed signal and a peak signal indicating the peak current of the power source, for calculating a predetermined optimum cutting condition formula in accordance with the peak signal and the speed signal, and for providing, as an output, the result thereof; and electrical cutting condition changeover means for changing the peak current of the power source so that the output from the arithmetic logic unit is reduced to substantially zero.

2. An automatic cutting condition changeover equipment according to claim 1, wherein the optimum cutting condition formula is $(F+F_0)Ip=K$, where F is the cutting speed, Ip is the peak current and $F_0$ and K are predetermined constants.

3. An automatic cutting condition changeover equipment according to claim 2, wherein the electrical cutting condition changeover means comprises:

a decision circuit operatively connected to the arithmetic logic unit, for deciding the value of the optimum cutting condition formula;

a counter operatively connected to the decision circuit, for counting up or down in accordance with the output from the decision circuit, and;

peak current changeover means operatively connected to the counter, for changing the peak current in accordance with the output from the counter.

4. An automatic cutting condition changeover equipment according to claim 3, which further comprises:

a detector operatively connected to the arithmetic logic unit, for detecting a variation in the mean working voltage, and wherein the value K in the optimum cutting condition formula is decreased in accordance with the variation in the mean working voltage.

5. An automatic cutting condition changeover equipment according to claim 1, wherein the optimum cutting condition formula is $(F+F_0)Iw=K$, where F is the cutting speed, Iw is a mean working current and $F_0$ and K are predetermined constants.

6. An automatic cutting condition changeover equipment according to claim 3, wherein the decision circuit further comprises: hysteresis means operatively connected to the arithmetic logic unit, for increasing the counter in accordance with the output of the arithmetic logic unit.

* * * * *

UNITED STATES PATENT AND TRADEMARK OFFICE
CERTIFICATE OF CORRECTION

PATENT NO. : 4,383,160
DATED : May 10, 1983
INVENTOR(S) : Obara

It is certified that error appears in the above-identified patent and that said Letters Patent is hereby corrected as shown below:

```
Column 1, line 14, "the" should be --a--;
          line 14, "an" should be --the--;
          line 40, after "and" insert --to--.

Column 3, line 42, after "path" insert --from--;
          line 61, after "Thus" insert --,--.

Column 4, line 60, after "Accordingly" insert --,--.

Column 5, line 10, after "Moreover" insert --,--.
```

Signed and Sealed this

Sixteenth Day of August 1983

[SEAL]

*Attest:*

GERALD J. MOSSINGHOFF

*Attesting Officer*    *Commissioner of Patents and Trademarks*